United States Patent [19]

Sirota

[11] Patent Number: 4,562,849
[45] Date of Patent: Jan. 7, 1986

[54] UMBRELLA UNIT, AND CAR AND THE LIKE PROVIDED THEREWITH

[76] Inventor: Vladimir Sirota, 130 E. 67th St., New York, N.Y. 10023

[21] Appl. No.: 565,167

[22] Filed: Dec. 23, 1983

[51] Int. Cl.⁴ .............................................. A45B 3/00
[52] U.S. Cl. .................................. 135/16; 135/20 M; 135/22
[58] Field of Search .................. 135/88, 90, 98, 20 M, 135/20 R, 16, 87, 89, 107, 109, 117, 903, 905

[56] References Cited

U.S. PATENT DOCUMENTS 1,988,380  1/1935  Goldberg .......................... 135/88 X
2,532,989  12/1950  Biondi .............................. 135/89 X
4,000,750  1/1977  Becher ........................... 135/20 M X

FOREIGN PATENT DOCUMENTS 70954  2/1983  European Pat. Off. .......... 135/20 R

Primary Examiner—Robert A. Hafer
Assistant Examiner—Danton DeMille
Attorney, Agent, or Firm—Ilya Zborovsky

[57] ABSTRACT

An umbrella unit has a housing, an umbrella with a protecting elements, a drive for opening and closing of the protecting element of the umbrella, and another drive for turning the umbrella into the housing and out of the housing. It can be mounted on a car and the like in the region of its doors to protect from rain car users during leaving and entering of the car and the like.

12 Claims, 6 Drawing Figures

UMBRELLA UNIT, AND CAR AND THE LIKE PROVIDED THEREWITH

BACKGROUND OF THE INVENTION

The present invention deals with an umbrella unit, particularly to be used with a car and the ike, and also to a car and the like provided with the same.

Umbrella units for cars and the like are known, for example from patent application Ser. No. 506,423 of the same inventor. In accordance with the known umbrella unit, the umbrella can be attached temporarily to car and opened or closed when a passenger or a driver have to leave or enter the car, thus protecting them from rain. The known construction satisfactory performs it intended functions. However, it does not provide successive turning of the umbrella out of its housing and then opening the same, and vice versa successive closing of the umbrella and turning the same back into the housing.

SUMMARY OF THE INVENTION

Accordingly, it is an object of the present invention to provide an umbrella unit which avoids the disadvantages of the prior art.

More particularly, it is an object of the present invention to provide an umbrella unit with the aid of which an umbrella can be turned out of its housing and opened, and vice versa, from inside of a car and the like on which it is mounted.

In keeping with these objects and with others which will become apparent hereinafter, one feature of the present invention resides, briefly stated, in an umbrella unit which has first drive with transmission for opening and closing of the umbrella, and second drive and transmission for turning the umbrella out of and into its housing.

When the umbrella unit is designed in accordance with the present invention, its operation and use is more convenient and reliable.

The novel features of the present invention are set forth in particular in the appended claims. The invention itself, however, both as to its manner of operation and its construction will be best understood from the following description of preferred embodiments which is accompanied by the following drawings.

DESCRIPTION OF PREFERRED EMBODIMENTS

Figure 1:
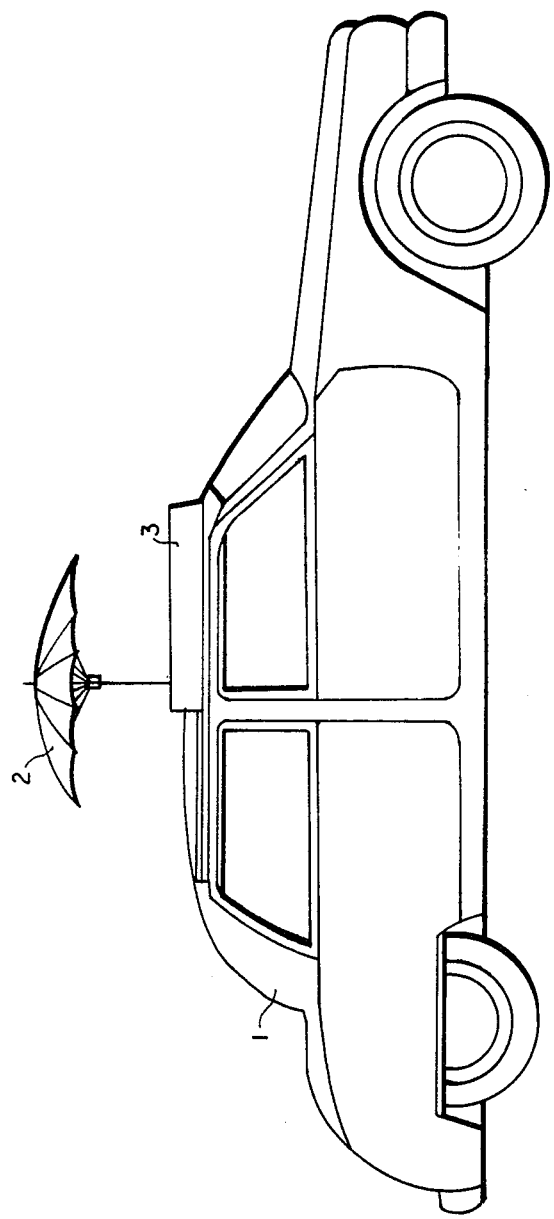
FIG. 1 is a view showing a car provided with an umbrella unit in accordance with one embodiment of the present invention.

An umbrella unit in accordance with the present invention has an umbrella which includes a conventional foldable protector and a central tube provided with a slot 31 and identified with reference numeral 32. A plurality of pivotable bars 34 and 35 connect the protector with the central tube 32. The bars 34 are connected with a sliding bush 33, and a spring 35 is provided between the bush 33 and the bars 34. A lever 29 pivotable about an axle 48 has a hook 42 and a projection 47. A flat spring 30 is located between the central tube 32 and the lever 29. The central tube 32 is fixed in a sleeve 27 composed of two parts. Two bevel gears 23 and 24 are located inside the sleeve 27 and engage with one another. The bevel gear 24 has a shaft 19 provided with a connecting piece 18 for example of a multi-cornered cross section. A pin 41 is connected with the bush 33 and can slide in the slots 31 of the tube 32. A rope 28 is connected with the pin 41 and can be wound onto a shaft of the bevel gear 23. All above-mentioned parts are components of the umbrella itself.

A receiving unit to be mounted on a car and the like includes a lower sleeve 6 connected with a lower cover, an inner sleeve 15 insertable in the lower sleeve 6 and fixable at 8 therewith, and an upper sleeve 25 slidable on the inner sleeve 15 and spring-biased by a spring 21 abutting at its lower end against a ring 20 and at its upper end against a shoulder 22. Balls 26 are located in lateral openings of the inner sleeve 15 and are movable in a radial direction. The lateral opening are designed with a reduced left outlet so as to prevent complete radial inward withdrawal of the balls from the openings. A friction brake for the inner sleeve 15 is formed by a friction body 9, a spring 12 and a screw 10. The sleeve 15 has an inner toothed rim 14. Satellite gears 11 are in engagement with the rim 14 and also with teeth of a vertical shaft 13 of a worm wheel 16. The later engages with a worm 5 which is driven by a motor 7. The satellite gears are connected with a carrier 17 which has a multi-cornered receiving opening. These components are parts of a drive for opening and closing of the umbrella.

Figure 3:
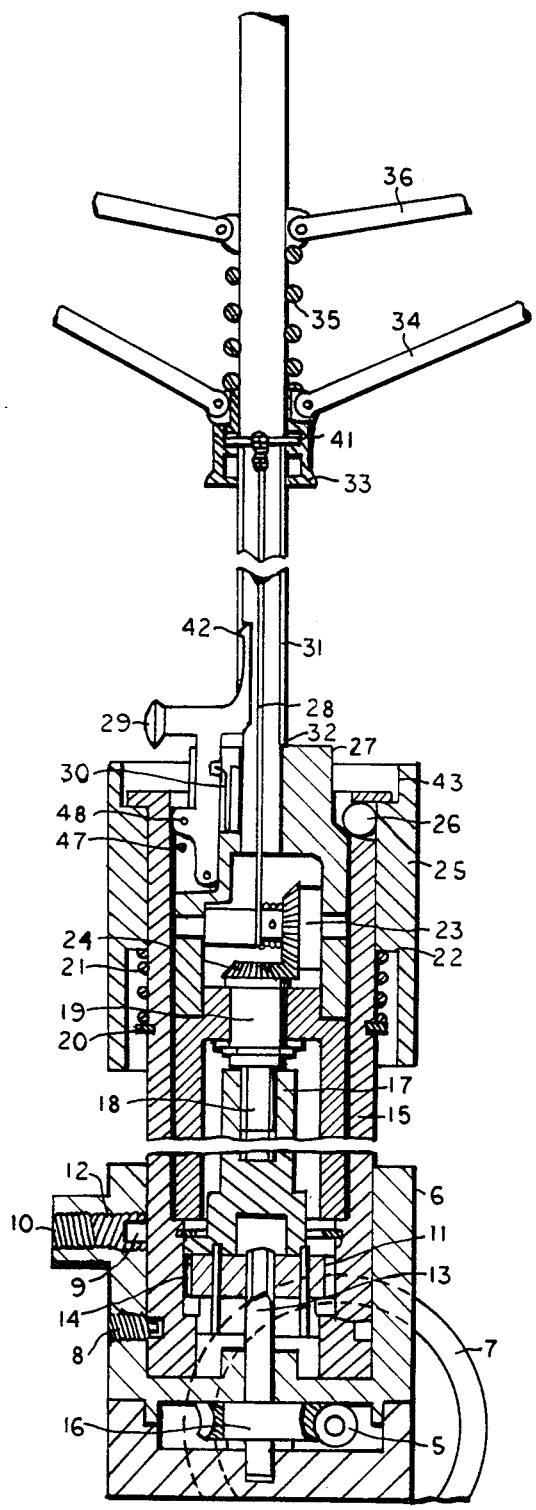
FIG. 3 is a view showing a crosssection of the umbrella unit in accordance with the present invention, and particularly its part responsive for closing and opening of an umbrella of the umbrella unit.
Figure 4:
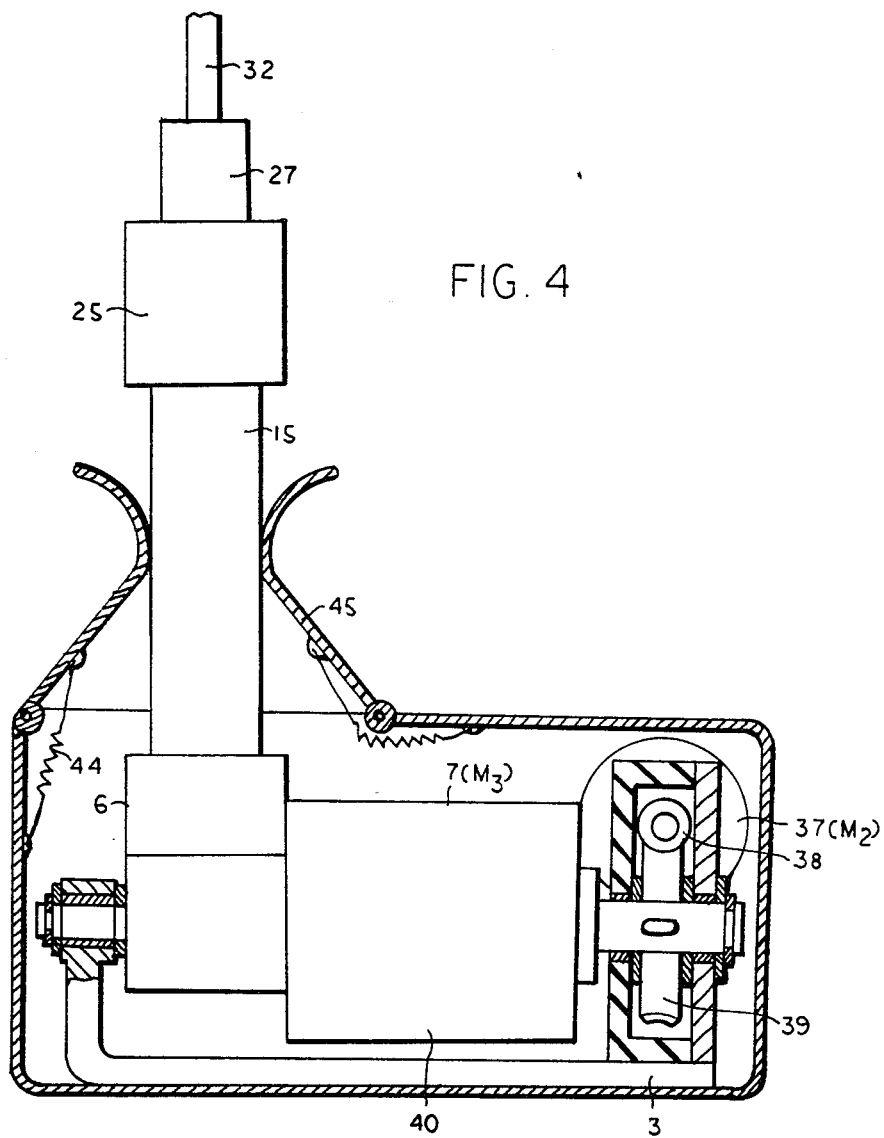
FIG. 4 is a view showing a cross section of the umbrella unit in accordance with the present invention, and particularly its part responsible for turning of the umbrella out of and into its housing.

A motor 37 is further provided and rotates a worm 38 which engages with a worm wheel 34. The latter has a shaft which is fixedly connected with a casing 40 of the motor 7. These components are parts of a drive for turning the umbrella about an axis of the shaft of the worm wheel 34. A housing 3 surrounds the second-mentioned drive shown in FIG. 4 and a part of the first-mentioned drive shown in FIG. 3 in turned-out position of the umbrella. In a turned-in position of the umbrella the housing 3 completely surrounds both drives, with the umbrella, as will be explained hereinbelow.

The housing 3 is provided with an opening. Two flaps 45 are pivotable relative to this opening and spring-biased toward the opening by springs 44. They can close and open the opening, as will be explained hereinbelow.

Figure 2:
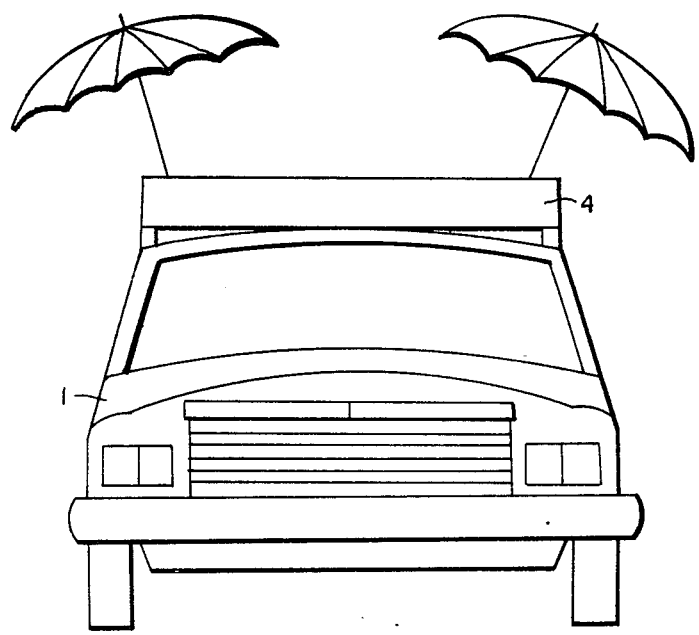
FIG. 2 is a view showing a car provided with an umbrella unit in accordance with another embodiments of the present invention.

As can be seen from FIG. 1, the housing 3 extends in direction of elongation of the car, and two such housings are provided above the left and right side doors of the car, respectively. Each housing has two such units, as described above. FIG. 2 shows a housing 4 extending in direction which is transverse to the direction of elongation of the car. Two such units as described above are located in the housing 4, each at one end of the latter.

Figure 5:
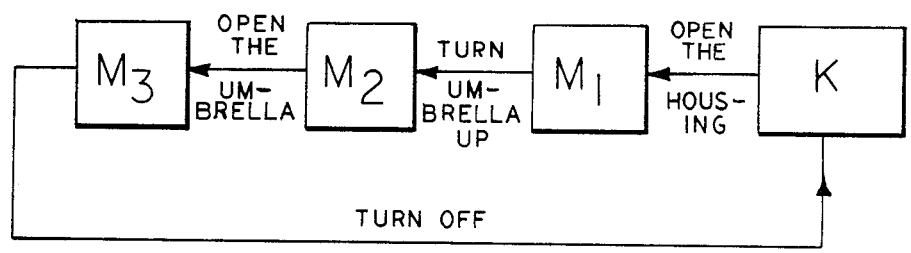
FIGS. 5 and 6 are views illustrating control of the inventive umbrella unit for performing the respective operations to turn the umbrella unit from use to non-use and vice versa.
Figure 6:
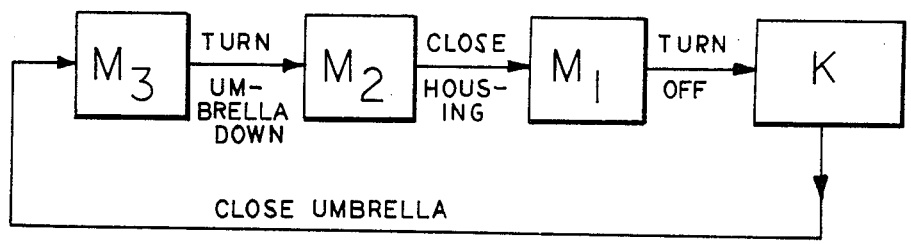

The umbrella unit is accordance with the present invention operates in the following manner. When the motor 37 is actuated by a user from inside of the car by any known actuating means, it rotates the worm 38, the worm wheel 34 and the casing of the motor 7 so that the sleeves 6,15,25 together with the parts located therein are turned from a storage position in which they are located inside the housing and extend horizontally, to an operative position shown in FIG. 4 in which they extend vertically, but the umbrella is still not open. Then the motor 7 is actuated by a user, or the motor 7 can be actuated by an end switch on which the sleeve 15 or other parts acts when the sleeves 6,15,25 assume their vertical position. The motor 7 rotates the shaft 13, the satellites 11, the carrier 17 and through the latter the parts 18,19,24 and 23 of the umbrella itself. The bevel 23 is provided inside it with a torsion spring. When the bevel gear 23 rotates, the rope 28 is unwound from its shaft, and the spring 35 acts so as to open the umbrella protector via the bars 34 and 36. The umbrella or particularly its protector thus opens under the area of the respective side door or doors to protect the user during leaving or entering of the car. In the embodiment of FIG. 1 the umbrella unit is turned about an axis extending horisontally in a transverse direction, wherein in the embodiment of FIG. 2 the umbrella units are turned about axes extending horizontally but in a longitudinal direction of the car. As shown in FIGS. 5 and 6 the control unit k located indide the car and operative for actuating the motors 7 and 38 can also act upon an additional motor $M_1$ which opens the flaps 45 for turning the umbrella out of the housing or back into the housing. Closing of the flaps 45 is performed under the action of the springs 44. After closing of the umbrella the parts of its foldable protector are relatively loose and do not tightly embrace the central tube of the umbrella. However, the flaps 45 are provided at their free ends with curved portions which form an inlet funnel. Thereby during turning the umbrella back into the housing and passing its protector between the flaps 45, the loose parts of the protector are pressed inwardly toward the central tube by the inlet funnel of the flaps 45 and tightly embrace the central tube of the umbrella in the storage position of the latter.

It should be emphasized that the umbrella unit can be used without the above-described motors. It can be actuated by a user manually through simple mechanical means, such as shafts and levers etc, extending from the car compartment to the respective parts of the umbrella. The umbrella can be removed from the car. For this purpose the upper sleeve 25 is pulled by the user downwardly, the balls 26 are displaced into a recess 43 of a greater diameter than the inner diameter of the upper sleeve 25, and the inner sleeve 27 is released. Then the central tube of the umbrella is pulled by a user upwardly and the teeth of the bevel gear 23 simply disengage from the teeth of the bevel gear 24. Thus the umbrella is withdrawn from the holder and can be used manually. The inner sleeve 27 serves as a handle of the umbrella. For insertion of the umbrella, it is again necessary to pull the outer sleeve 25 downwardly so that the balls 26 displace radially outwardly into the recess 43 an allow the insertion. Then the inner sleeve 27 is moved downwardly and the teeth of the bevel gear 23 engage with the teeth of the bevel gear 24. The umbrella unit is ready for motor operation.

When the umbrella is removed from the car, the user presses the lever 29 toward the central tube 32 and releases the bush 33 for opening of the umbrella. When the bush 33 is pulled downwardly by the user for closing of the umbrella the tooth 42 engages the bush and holds the umbrella closed. The umbrella unit can be provided without the additional motor $M_1$, since the flaps 45 can be actuated by turning of the umbrella into and out of the housing.

The planetary transmission forms a differential mechanism, so that when during a reverse action of the unit the motor 7 pulled down the bush 33 and closed the umbrella, the planetary transmission acts so that the sleeve 15 overcomes the friction of the friction body 9, starts to rotate, and rotates the inner sleeve 27.

The invention is not limited to the details shown since various modifications and structural changes are possible without departing in any way from the spirit of the present invention.

What is desired to be protected by Letters Patent is set forth in particular in the appended claims.

I claim:

1. A motor-driven umbrella unit, particularly for mounting on a car, comprising
   a housing mountable on a car and having an inner hollow;
   an umbrella having a protector and protector-actuating means operative for closing and opening said protector;
   a first motor drive;
   a first transmission arranged to connect said first motor drive with said protector-actuating means for closing and opening of said protector;
   first actuation means allowing said first motor to be actuatable by a user;
   a second motor drive;
   a second transmission arranged to connect said second motor drive with said umbrella so as to turn said umbrella into said inner hollow of said housing and out of said inner hollow of said housing;
   second actuation means allowing said second motor to be also actuatable by a user, said first transmission having a driven gear member connected with said protector-actuating means, and a driving gear member which meshes with said driven gear member, said driven gear member being disengageable from said driving gear member so that said umbrella with said protector can be removed from the motor-driven unit as a part of the latter and used separately and manually by a user, and said driven gear member being also engageable with said driving gear member for returning said umbrella with said protector into the unit and acting upon by said motor drives so as to complete the motor-driven unit;
   a support which supports said driven gear umbrella and is movable in one direction away of said driving gear member for disengagement of said driven gear member from said driving gear member and in another direction for engagement of said driven gear member with said driving gear member; and
   locking means actuatable by a user to move between a locking position in which said locking means locks said support and prevents its movement in said one direction thereby retaining said driven member in engagement with said driving member, and a releasing position in which said locking means releases said support and allows its movement in said one direction and also in said other direction thereby allowing disengagement of said driven gear member from said driving gear member for removal of said umbrella and its separate manual use, and bringing said driven gear member into engagement with said driving gear member for completing the motor-driven unit, respectively.

2. An umbrella unit as defined in claim 1, wherein said housing extends substantially horizontally, said first motor drive including a motor having a substantially horizontal axis and provided with a casing, said second drive including a motor having a substantially horizontal axis which is normal to said axis of said first-mentioned motor and arranged to cooperate with casing of said first-mentioned motor so as to turn said first motor drive and said umbrella about a horizontal axis.

3. An umbrella as defined in claim 2, wherein said second-mentioned motor has a shaft formed as a worm shaft; and further comprising a worm wheel engaging with said worm shaft and having a shaft fixedly connected with said casing of said first-mentioned motor, so that when said second-mentioned motor rotates said worm shaft, the latter rotates said worm wheel with said shaft of said worm wheel and thereby turns said casing of said first-mentioned motor about the horizontal axis.

4. An umbrella unit as defined in claim 1, wherein said housing is elongated in a first direction, said umbrella being turnable by said second motor drive and said second transmission so that when said umbrella is located in said inner hollow of said housing it extends in said first direction.

5. An umbrella unit as defined in claim 4, wherein said housing is mountable on a car so as to be located above one of its side windows and to extend in a longitudinal direction of the car.

6. An umbrella unit as defined in claim 1, wherein said housing is elongated in a first direction and has two ends spaced from one another in said first direction; and further comprising additional such first and second motor drives and first and second transmissions as well as an additional umbrella, said first-mentioned umbrella and first and second motor drives with first and second transmissiones being arranged at one end of said housing, whereas said additional umbrella and first and second motor drives with first and second transmissions are arranged at the other end of said housing.

7. An umbrella unit as defined in claim 6, wherein said housing has a central region located between said ends, said first-mentioned umbrella and said second mentioned umbrella being turnable from the respective ends into said central region of said housing.

8. An umbrella unit as defined in claim 7, wherein said housing is mountable on a car so as to be located above its side windows and extend in a direction which is transverse to a direction of elongation of the car, so that when said umbrellas are turned out of said housing and are opened each of said umbrellas are located above a respective one of the side windows of the car.

9. An umbrella unit as defined in claim 1; and further comprising means arranged to actuate successively said second motor drive and then said first motor drive and also said first drive and then said second motor drive so as to turn umbrella out of said housing for use and to open the same, and also to close said umbrella and to turn it back into said housing for non-use.

10. An umbrella unit as defied in claim 9; and further comprising closing means arranged to close said housing when said umbrella is in said housing and when said umbrella is removed from said housing, said closing means being movable for allowing said umbrella to move between its positions inside and outside of said housing; and an additional motor drive arranged to move said closing means between its open position allowing moving of said umbrella and its closed ppsition.

11. A car and an umbrella unit combination, comprising
a car; and
a motor-driven umbrella unit including a housing mountable on a car and having an inner hollow, an umbrella having a protector and protector-actuating means operative for closing and opening said protector, a first motor drive, a first transmission arranged to connect said first motor drive with said protector-actuating means for closing and opening of said protector, first actuation means allowing said first motor drive to be actuatable by a user, a second motor drive, a second transmission arranged to connect said second motor drive with said umbrella so as to turn said umbrella into said inner hollow of said housing and out of said inner hollow of said housing, a second actuation means allowing said second motor drive to be also actuatable by a user, said first transmission means having a driven gear member connected with said protector-actuating means, and a driving gear member which meshes with said driven gear member, said driven gear member being disengageable from said driving gear member so that said umbrella with said protector and said protector-actuating means can be removed from the motor-driven unit as a part of the latter and used separately and manually by a user, and said driven gear member being also engageable with said driving gear member for returning said umbrella into the unit and acting upon by said motor drives so as to complete the motor-driven unit, a support which supports said driven gear member and is movable in one direction away of said driving gear member for disengagement of said driven gear member from said driving gear member and in another direction for engagement of said driven gear member with said driving gear member, and locking means actuatable by a user to move between a locking position in which said locking means locks said support and prevents its movement in said one direction thereby retaining said driven gear member in engagement with said driving gear member, and a releasing position in which said locking means releases said support and allows its movement in said one direction and also in said other direction thereby allowing disengagement of said drive gear member from said driving gear member for removal of said umbrella and its separate manual use, and bringing said driven gear member into engagement with said driving gear member for completing the motor-driven unit, respectively.

12. An umbrella unit, particularly for mounting on a car, comprising a housing mountable on a car and having an inner hollow; and umbrella having a central tube, a protector connected with said central tube and protector-actuating means operative for closing and opening said protector; a first motor drive; a first transmission arranged to connect said first motor drive with said protector-actuating means for closing and opening of said protector; first actuation means allowing said first motor drive to be actuatable by a user; a second motor drive; a second transmission arranged to connect said second motor drive with said umbrella so as to turn said umbrella into said inner hollow of said housing; second actuation means allowing said second motor drive to be also actuatable by a user; and closing means for closing said housing when said umbrella is in said housing and also when said umbrella is removed from said housing, said housing having an opening through which said umbrella can be removed and inserted back, said closing means including two spring-biased covers formed as flaps and arranged to open and to close said opening, said flaps being movable between an open position and a closed position and each having a free end provided with a curved portion which is formed so that when said flaps are in said open position said portions together form an inlet funnel so that during turning of said umbrella into said inner hollow of said housing said inlet funnel presses said protector toward said central tube.

* * * * *